United States Patent
Sasson et al.

(10) Patent No.: US 8,101,144 B2
(45) Date of Patent: Jan. 24, 2012

(54) SCRUBBER FOR REMOVING HEAVY METALS FROM GASES

(75) Inventors: Yoel Sasson, Jerusalem (IL); Mandan Chidambaram, Jerusalem (IL); Zach Barnea, Jerusalem (IL)

(73) Assignee: Yissum Research Development Company of the Hebrew University of Jerusalem, Ltd. (IL)

( * ) Notice: Subject to any disclaimer, the term of this patent is extended or adjusted under 35 U.S.C. 154(b) by 0 days.

(21) Appl. No.: 12/858,025

(22) Filed: Aug. 17, 2010

(65) Prior Publication Data
US 2011/0081286 A1 Apr. 7, 2011

Related U.S. Application Data

(63) Continuation-in-part of application No. 12/745,632, filed as application No. PCT/IL2008/001563 on Dec. 3, 2008, now abandoned.

(60) Provisional application No. 60/996,731, filed on Dec. 3, 2007.

(51) Int. Cl.
*B01D 53/64* (2006.01)
*B01D 53/74* (2006.01)
*C09K 3/00* (2006.01)

(52) U.S. Cl. .................. 423/210; 422/168; 252/182.32; 252/183.14

(58) Field of Classification Search .................. 423/210; 422/168; 252/182.32, 183.14
See application file for complete search history.

(56) References Cited

U.S. PATENT DOCUMENTS

| 4,233,274 A | 11/1980 | Allgulin |
| 5,354,363 A | 10/1994 | Brown, Jr. et al. |
| 6,855,859 B2 | 2/2005 | Nolan et al. |
| 2007/0123660 A1 | 5/2007 | DeGouvea-Pinto et al. |

FOREIGN PATENT DOCUMENTS

EP 0262970 B1 7/1992

OTHER PUBLICATIONS

Lei Ji et al. "Pyrrolidinium Imides: Promising Ionic Liquids for Direct Capture of Elemental Mercury from Flud Gas" Water Air Soil Pollution: Focus (2008) vol. 8 pp. 349-358.*

I. Jerman et al. "Ionic conductivity, infrared and Raman spectroscopic studies of 1-methyl-3-3propylimidazolium iodide ionic liquid with added iodine" Electrochimica Acta (2008) vol. 53 pp. 2281-2288.* http://www.epa.gov/ttn/caaa/t1/reports/sec5-4.pdf, 42 Pages.

Jerman et al. "Ionic Conductivity, infrared and Raman spectroscopic studies of 1-methyl-3-propylimidazolium iodide ionic liquid with added iodine", Electrochimica Acta 2008, vol. 53, p. 2281-2288.

(Continued)

*Primary Examiner* — Timothy Vanoy
(74) *Attorney, Agent, or Firm* — Brooks Kushman P.C.

(57) ABSTRACT

A wet scrubber for absorbing elemental heavy metal from a gas stream, a liquor for a wet scrubber, and a power-plant comprising a wet scrubber are described. The wet scrubber includes a vessel having a gas inlet and outlet. In the vessel is a liquor including a oxidizer capable of oxidizing the elemental heavy metal and an ionic liquid. The liquor is substantially free of any ligand capable of bonding an ion of the heavy metal.

27 Claims, 5 Drawing Sheets

OTHER PUBLICATIONS

Ji et al. "Pyrrolidinium Imides: Promising Ionic Liquids for Direct Capture of Elemental Mercury from Flue Gas", Water Air Soil Pollution: Focus 2008, vol. 8, p. 349-358.

Ji et al. "Room Temperature Ionic Liquids for Mercury Capture from Flue Gas", Industrial and Engineering Chemistry Research 2008, vol. 47, p. 8396-8400.

International Search Report for PCT/IL2008/001563, Completed by the European Patent Office on Apr. 17, 2009, 3 Pages.

Varma et al. "An Expeditious Solvent-free route to ionic liquids using microwaves", Chemical Communications 2001, p. 643-644.

Germani et al. "Mercury Extraction by ionic liquids: temperature and alkyl chain length effect", Tetrahedron Letters 2007, vol. 48, p. 1767-1769.

* cited by examiner

SCRUBBER FOR REMOVING HEAVY METALS FROM GASES

CROSS-REFERENCE TO RELATED APPLICATIONS

This application is a continuation-in-part of U.S. application Ser. No. 12/745,632 filed Dec. 17, 2010, now abandoned, which is a 371 national phase of PCT/IL2008/001563 filed Dec. 2, 2008 which, in turn, claims the benefit of U.S. provisional Application No. 60/996,731 Dec. 3, 2007.

FIELD OF THE INVENTION

The present invention, in some embodiments thereof, relates to a system and process for removing heavy metals from gases, and in particular, for doing so by contacting the gases with a liquid.

BACKGROUND OF THE INVENTION

Scrubbers are air pollution control devices, used to remove particulates and/or gases from industrial exhaust streams. In a wet scrubber, the exhaust stream contacts a liquid which absorbs the pollutant, and leaves the device clean from the pollutants, or at least, cleaner than it enters.

U.S. Pat. No. 5,354,363, the disclosure of which is incorporated herein by reference, describes a wet scrubber, which employs liquid gallium to absorb vapor phase mercury from a hot gas exhaust stream in an industrial exhaust system. The temperature of the liquid gallium is elevated for optimum adsorption efficiency, and subsequently lowered to separate the absorbed mercury.

U.S. Pat. No. 6,855,859, the disclosure of which is incorporated herein by reference, describes a wet scrubber for removing elemental and oxidized mercury from a gas. The scrubber utilizes two aqueous solutions, each being contacted with the gas at a different location in the scrubber. A first aqueous solution is used to oxidize the elemental mercury to obtain a chloride salt, and the second—to react the chloride salt with a sulfide to obtain insoluble mercuric sulfide. The mercuric sulfide precipitates, and the gas leaves the solution with less elemental mercury.

US 2007/0123660 to deGouvea-Pinto, the disclosure of which is incorporated herein by reference, describes the use of an ionic-liquid/ligand combination, immobilized on a silica substrate, for separating mercuric chloride from nitrogen.

deGouvea-Pinto states that "the ionic liquid is a chemically active environment for solubilization or reaction with the metal vapor. For example, oxidized metals can be made to absorb with high affinity for subsequent chelation, and elemental metals can be oxidized by the layer [of ionic liquid] prior to adsorption on the ligand. [ . . . ] It has been demonstrated that elemental mercury is captured in this ionic liquid [=pyrrolidinium bis(trifluoromethane sulfonyl)imide salt] due to simultaneous oxidation and solvation. Furthermore, the use of additives to further enhance the reactive environment in the ionic liquid has also been demonstrated. For example, $KMnO_4$ (up to 0.25 mmole) has been used as an additive to enhance the oxidation of elemental mercury".

deGouvea-Pinto also states that "a wide variety of combinations of ionic liquids, chelating agent, or other ligands, and solid supports can be used together, as well as the ionic liquid/ligand combination independent of a solid substrate will function to adsorb/absorb metal atoms in a gaseous stream".

Other publications of deGouvea-Pinto relating to capture of mercury by ionic liquids include:

Mercury extraction by ionic liquids: temperature and alkyl chain length effect Tetrahedron Letters 48 (2007) 1767-1769;

Pyrrolidiniiom Imides: Promising Ionic Liquids for Direct Capture of Elemental Mercury from Flue Gas Water Air Soil Pollut: Focus 8 (2008) 349-358; and Room Temperature Ionic Liquids for Mercury Capture from Flue Gas Ind. Eng. Chem. Res. Published on the web Oct. 1, 2008.

It is noted that citation or identification of any reference in this application in general and in the background section in particular, shall not be construed as an admission that such reference is available as prior art to the present invention.

REFERENCES

[1] U.S. Pat. No. 5,354,363
[2] U.S. Pat. No. 6,855,859
[3] US 2007/0123660
[4] Tetrahedron Letters 48 (2007) 1767-1769
[5] Water Air Soil Pollut: Focus 8 (2008) 349-358
[6] Ind. Eng. Chem. Res. Published on the web Oct. 1, 2008
[7] http://www.epa.gov/ttn/caaa/t1/reports/sect5-4.pdf

SUMMARY OF THE INVENTION

An aspect of some embodiments of the invention is a wet scrubber, suitable for removing heavy metals from a gas stream, and in particular for removing elemental mercury from flue, combustion and exhaust gases, generally referred to herein as "flue gas". The wet scrubber preferably holds a liquor that contains an oxidizer dissolved in a non-volatile liquid. The oxidizer is selected as to oxidize the elemental metal into a salt; and the liquid is optionally selected as to stabilize the oxidizer. In an exemplary embodiment of the invention, the scrubber is configured to provide output of a gas clean of the heavy metal and free from vapors of the liquid or of that of the oxidizer.

Examples of heavy metals that can be treated with some embodiments include mercury, uranium, cadmium, arsenic, lead, and tin.

There is thus provided, according to an exemplary embodiment of the invention, a wet scrubber for absorbing elemental heavy metal from a gas stream, the scrubber comprising:

a vessel having a gas inlet and a gas outlet, and in the vessel,
a liquor comprising:
an oxidizer capable of oxidizing said elemental heavy metal and
an ionic liquid,
the liquor being substantially free of any ligand capable of binding an ion of the heavy metal.

Optionally, the liquor consists essentially of an ionic liquid and an oxidizer.

In some embodiments, the wet scrubber comprises a liquid inlet and a liquid outlet, and the scrubber is configured to contact liquid with the gas between the liquid inlet and outlet.

In some embodiments the oxidizer is selected from fluorine ($F_2$), chlorine ($Cl_2$) Bromine ($Br_2$), ozone ($O_3$), bromine dioxide ($BrO_2$); hypochlorite ($HOCl$); sodium chlorite ($NaClO_2$); and potassium chlorite ($KClO_2$).

In some embodiments, the oxidizer is chlorine dioxide.

In some embodiments, the oxidizer is a halogen, for example, iodine.

In some embodiments, the ionic liquid comprises a cation and an anion, and said anion is a halide.

There is further provided, according to an exemplary embodiment of the invention, a wet scrubber for absorbing, at a working temperature, a heavy metal from a gas stream, the scrubber comprising:

a vessel having a gas inlet and a gas outlet, and in the vessel, a liquor comprising:

an ionic liquid comprising an anion and a cation, and an oxidizing complex capable of oxidizing, at the working temperature, said heavy metal, the oxidizing complex comprising an oxidizing moiety and a complexing agent, said oxidizing complex having, in the liquor, a partial vapor pressure that is at least 10 times smaller than a vapor pressure of the oxidizing moiety in pure state.

In some embodiments, the complexing agent is one of the anion and cation forming together the ionic liquid.

In some embodiments, the oxidizing complex comprises chlorine dioxide.

In some embodiments, the oxidizing moiety is a halogen, optionally iodine.

In some embodiments, the oxidizing complex is a compound of the general formula X2Y—, wherein each of X and Y is independently selected from Br, Cl, and I.

Optionally, the wet scrubber comprises a liquid inlet and a liquid outlet, and the scrubber is configured to contact liquid with the gas between said liquid inlet and outlet.

There is further provided, according to an exemplary embodiment of the invention, a wet scrubber for absorbing a heavy metal from a gas stream, the scrubber comprising: a vessel having a gas inlet and a gas outlet, a liquid inlet and a liquid outlet, and in the vessel, a liquor moving from the liquid inlet to the liquid outlet, the liquor comprising an ionic liquid and an oxidizer capable of oxidizing the heavy metal.

Optionally, the wet scrubber comprises a filter configured for separating solids from the liquor exiting from the vessel.

In some embodiments, the wet scrubber comprises a liquid path configured for feeding the liquid inlet with liquor that has exited from the vessel.

In some embodiments, the oxidizer comprises chlorine dioxide. In some embodiments, the oxidizer comprises iodine.

In some embodiments, the oxidizer comprises a halogen-halide complex.

In some embodiments, the liquor is in form of small droplets or mist.

In some embodiments, the heavy metal is elemental and the ionic liquid has an oxidation potential that is insufficient for oxidizing the elemental heavy metal at the working temperature of the scrubber.

In some embodiments, the wet scrubber is configured for removing metal salt from liquor exiting from the vessel, and returning the liquor to the vessel.

There is further provided, according to an exemplary embodiment of the invention, a method of scrubbing elemental heavy metal, for example mercury, from a gas stream, the method comprising:

providing a liquor free to move in a vessel, the liquor comprising an ionic liquid and an oxidizer capable of oxidizing the elemental metal; and directing the gas stream into the vessel so as to contact with the liquor.

In some embodiments, providing a liquor comprises: reacting the ionic liquid with an oxidizing moiety, thereby obtaining a liquor comprising: the ionic liquid and an oxidizing complex comprising the oxidizing moiety complexed with an ion of said ionic liquid.

In some embodiments, the oxidizer comprises chlorine dioxide.

In some embodiments, the oxidizer comprises a halogen, for example, iodine.

Optionally, the ionic liquid comprises an anion and a cation, and said anion is selected from chloride, bromide, and iodide.

Optionally, contacting the gas with the liquor comprises bubbling a gas into the liquor.

Alternatively or additionally, contacting the gas with the liquor comprises contacting the gas with liquor in the form of droplets or mist.

In some embodiments, the ionic liquid has an oxidation potential that is insufficient for oxidizing the elemental heavy metal.

There is further provided, according to an exemplary embodiment of the invention, compound of the general formula A+X—Y2, wherein A+X—, at 25° C., is an ionic liquid; and X and Y are each independently F, Cl, Br, or I.

Optionally, A+ is a cyclic tertiary ammonium cation.

Optionally, A+ is an aromatic cation.

Optionally, A+ is according to any of the general formulae I-VIII below:

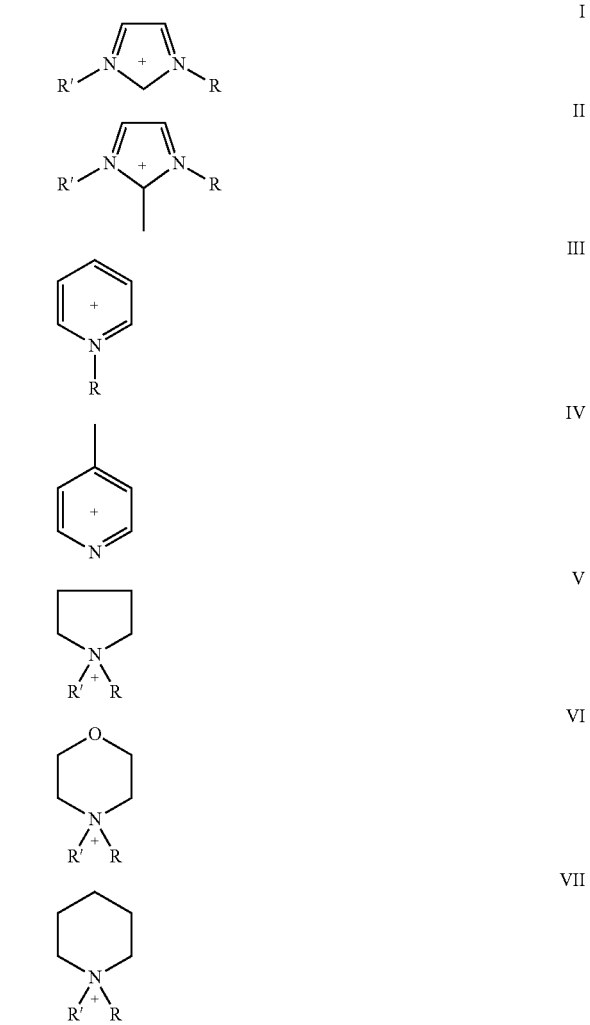

wherein each of R and R' independently is a C2-C10 alkyl.

In some embodiments, A+ is selected from 1-butyl-3-methylimidazolium, 1-hexyl-3-methylimidazolium, and 1-octyl-3-methylimidazolium.

In some embodiments, Y is I.

In some embodiments, X is Cl.

Optionally, in a wet scrubber and/or a method as described above, the liquor comprises a compound as described above.

There is further provided, according to an exemplary embodiment of the invention, a power plant comprising:

a furnace exhausting a gas; and a scrubber, receiving gas from the furnace, wherein the scrubber is as described above.

Optionally, the power plant comprises a flue gas desulfurization unit, receiving gas from the furnace, wherein the scrubber receives gas from said unit.

Optionally, the furnace is coal-fired.

In some embodiments, the gas comprises mercury.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to removing heavy metals from gases, and in particular, for doing so by contacting the gases with liquid liquor.

For example, an embodiment of the invention is a wet scrubber, capable of removing heavy metals, for instance mercury, from a gas stream. In some embodiments, the heavy metal is removed whether it exists in ionic form, elemental form, or particulate bound form.

The invention may find utility, for instance, in coal-fired power plants, or nay other industrial appliance exhausting flue gas that contains mercury or other heavy metals. Mercury may be of particular interest, since it is hazardous, and cannot be removed efficiently from a flue gas in state of the art methods.

Various embodiments of the invention utilize scrubbers that have the structure of known scrubbers, for instance, one of the structures described in the following web-site: http://www.epa.gov/ttn/caaa/t1/reports/sect5-4.pdf, incorporated herein by reference.

An embodiment of the invention relates to a wet scrubber that utilizes a non-volatile liquor as a scrubbing liquid. A non-volatile liquor may be beneficial in that the liquor does not substantially evaporate out of the scrubber with the clean gas, thus does not pollute the environment with liquor vapor and does not require frequent refill.

A preferred family of non-volatile liquids is the family of ionic liquids. The ionic liquid may be employed free of any medium or may be used in combination with at least one liquid medium such as water, alcohol, ethylene glycol, polyethylene glycol, DMSO, DMF, methylnaphthalene or others. The liquid medium may constitute between 0 and 50% w/w of the liquid non-volatile liquor.

An ionic liquid is a substance that exists mainly in ionic form, thus, optionally, 100% of the liquid is in form of ions. Where at least one other liquid component is present, e.g., water, a lower concentration of ions may be present. In some embodiments, the concentration of the ionic liquid is between 30 and 100% of the liquor, with the at least one liquid medium constituting up to 70% of the liquor.

Figure 5:
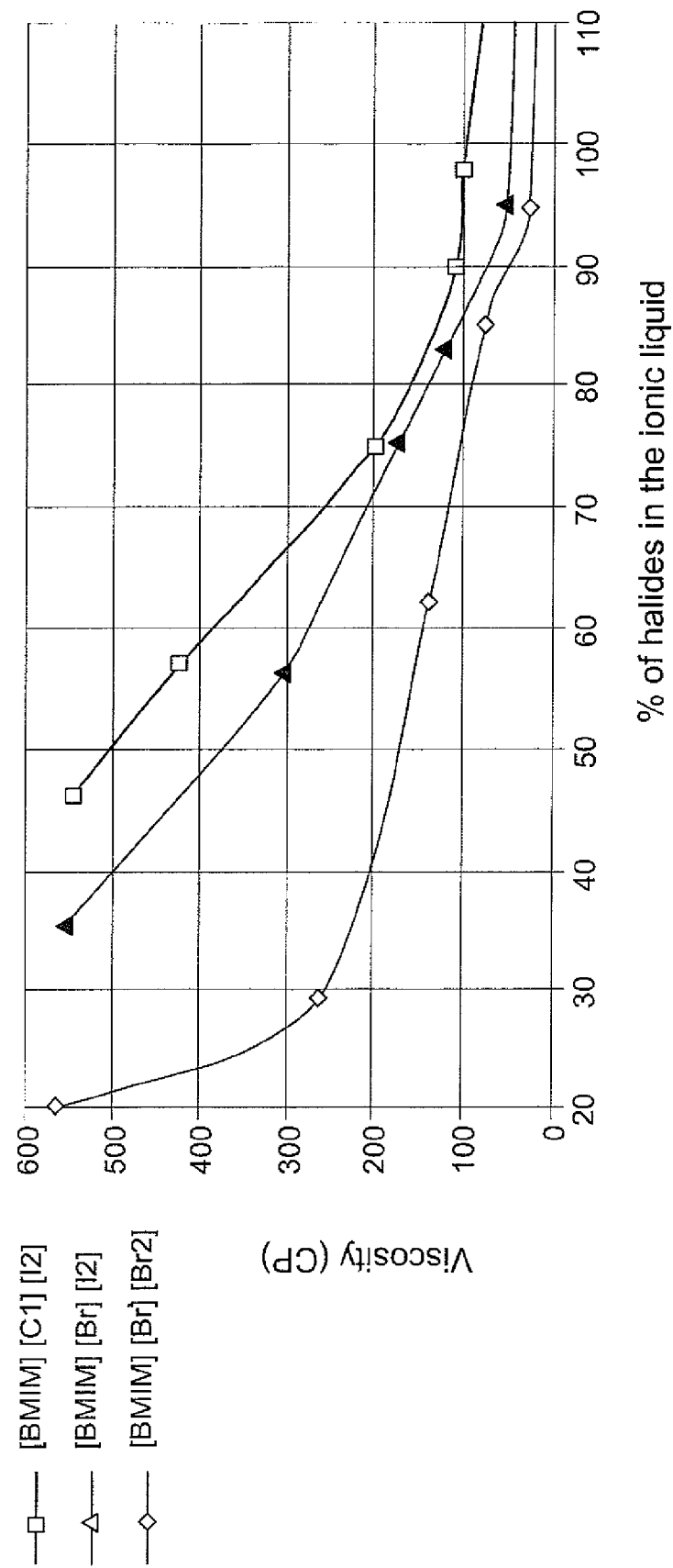
FIG. 5 is a graph showing the viscosity of several ionic liquids with different iodine content.

Ionic liquids suitable for use in accordance with the present invention are those that exist as liquids at the operating temperature of the scrubber. In some embodiments, this temperature depends on the scrubber's specific position inside a power plant. Some typical temperature values are in the range of between about 40° C. and 80° C., although many embodiments are useful within a broader temperature range, for instance, between about −20° C. and about 200° C. Some ionic liquids, for example 1-butyl-3-methylimidazolium chloride, [BMIM] [Cl], are solids at room temperature. In some embodiments, a solid ionic liquid may be liquefied without heating, by dissolving a solute. For example, [BMIM] [Cl] was found to be solid in room temperature in pure state, and liquid when dissolving 50% iodine. FIG. 5 is a graph showing the viscosity of several ionic liquids with different iodine content, measured in relation to the amount of [BMIM] [Cl]. In another example, [BMIM] [Cl] was found solid in pure state and liquid when 1% of bromine was added to the [BMIM] [Cl].

In an exemplary embodiment of the invention, the ionic liquid has an oxidation potential that is insufficient for oxidizing the elemental metal at the working conditions of the scrubber. In this embodiment, removing elemental mercury from flue gas is optionally accomplished by adding an oxidizer to the ionic liquid.

In preferred embodiments of the invention, the liquor contains an oxidizer capable of oxidizing the heavy metal. An oxidizer capable of oxidizing the heavy metal is capable, at the working conditions of the scrubber, of oxidizing elemental heavy metal into a salt. Examples of suitable oxidizers include iodine and chlorine dioxide.

Preferably, the oxidizer is of minimal corrosiveness and toxicity. Iodine and chlorine dioxide are examples of non-corrosive oxidizers that have low-toxicity. Iodine is easier to handle than many other oxidizers. However, iodine has a disadvantage in being very volatile. Its vapor pressure at room temperature is equal to the atmospheric pressure, and therefore, solid iodine is fuming. If iodine were used in a scrubber, it would be expected to escape from the scrubber together with the flue gas, and cause environmental damage. Furthermore, it could be expected that large amounts of iodine will be lost, and frequent iodine refill would be required.

It has been surprisingly found that iodine does not escape when it is dissolved in ionic liquids and especially so, when it is dissolved in ionic liquids having a halide (for example chloride, bromide, or iodide) as one of their components. Without being bound to theory, it is suggested that the halide of the ionic liquid forms an anionic oxidizing complex with the iodine, and this anionic complex does not evaporate out of the liquor due to the anion's attraction to the cations of the ionic liquid.

It was also surprisingly found that at temperatures lower than 130°C. chlorine dioxide (ClO2) does not escape from ionic liquids, and a non-binding explanation of a stabilizing complex between the ClO2 and the anion of the ionic liquid may be suggested for explaining this finding.

UV-Vis spectra of ionic liquids mixed with iodine have shown no absorption of free iodine, which normally appears at 460 nm. The same samples have shown absorption peaks at 250 nm for bromide-containing ionic liquids and 232 nm for chloride-containing ionic liquids. These absorption peaks are similar to absorption peaks observed for I2Br— and I2Cl— in some other solvents.

Iodine-halide complexes are known to form in aqueous solutions when a metal halide salt, such as potassium iodide, is added to an aqueous solution of iodine. However, the inventor is not aware of any scientific publication that reported the formation of this complex without a metal halide salt. The inventor is also not aware of any publication relating to formation of halogen-halide complex in a halide-containing ionic liquid.

In an embodiment of the invention, iodine is used as an oxidizer and a halide salt is added to form halogen-halide complex.

Preferably, the molar concentration of the halide is much larger than that of the halogen, such that all the halogen is in form of halogen-halide complex. Examples of preferable halogen-halide ratios include 1:100, 1:500 and 1:1000.

Before explaining at least one embodiment of the invention in detail, it is to be understood that the invention is not necessarily limited in its application to the details of construction and the arrangement of the components and/or methods described in the following description, drawings and/or the Example. The invention may be practiced or carried out in various ways, and is capable of other embodiments than those described below.

Figure 1:
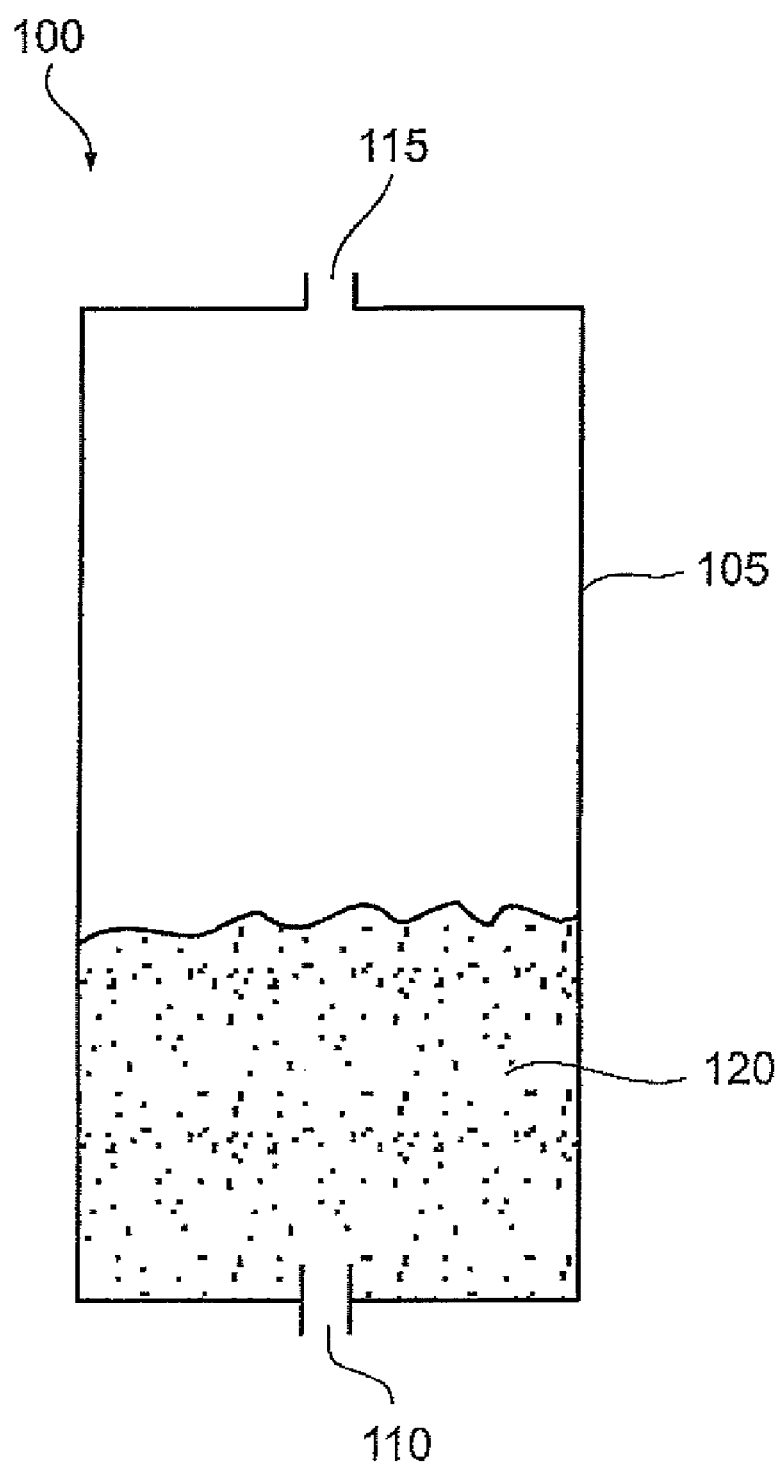
FIG. 1 is a schematic illustration of a scrubber according to an embodiment of the invention.

FIG. 1 is a schematic illustration of a scrubber 100 according to an embodiment of the present invention. FIG. 1 illustrates, inter alia, that the scrubber comprises liquor 120 that is free to move inside the vessel, as usual with wet scrubbers, rather than being static, for instance, coating some solid support, as may be found in some liquid-containing dry scrubbers. A liquor free to move inside the vessel may be easier to refresh than an immobilized liquor.

Scrubber 100 is configured for separating at least one heavy metal from a gas stream, such as the flue of a power generator or other burning solid or fluid. The heavy metal is optionally one or more of vanadium, cadmium, lead, and mercury. In an exemplary embodiment of the invention, the heavy metal is mercury.

Scrubber 100 comprises a vessel 105 having a gas inlet 110 and a gas outlet 115. Shown in the vessel 105 is a liquor 120, comprising an ionic liquid. In an exemplary embodiment of the invention, scrubber 100 is used to clean a gas stream from heavy metals. In the embodiment shown, gas entering vessel 105 through gas inlet 110 bubbles within ionic liquid 120, and exists through outlet 115.

In an embodiment of the invention, liquor 120 includes only an ionic liquid and an oxidizer.

Alternatively, liquor 120 includes an ionic liquid, an oxidizer, and additional components. In an exemplary embodiment, the additional components do not substantially change basic characteristics of the liquor, as defined below. In this embodiment, the liquor is said to substantially consist of an ionic liquid and an oxidizer.

One way to test if a certain liquor consists essentially of an ionic liquid and an oxidizer includes: removing all the additional components; and measuring changes in the basic characteristics of the liquor. If these changes are less than 10%, the liquor consists essentially of the ionic liquid and the oxidizer. Preferably, the characteristics are compared at the operation temperature of the scrubber.

Examples to basic characteristics of the liquor include the capability of the liquor to absorb the heavy metal, the vapor pressure of the liquor, and the viscosity of the liquor.

Preferably, the liquor has, at the operating temperature of the scrubber, a vapor pressure that is as low as possible, for example, lower than 1 mmHg.

Liquors of lower viscosity are generally preferred, because they allow bubbling the gas stream into the liquor (or contacting the gas with the liquor in any other way) more easily than more viscous liquors. However, low viscosity and low vapor pressure are usually two contradicting requirements. In some embodiments of the invention, it is preferable that the viscosity of the liquor, at the working temperature of the scrubber, is lower than 250 mPa·s, optionally between about 50 mPa·s. and 200 mPa·s.

As used in the present description and claims, an ionic liquid is a substance, which at the working temperature is liquid, and at least 90% of the liquid, optionally at least 99% of the liquid, is in the form of ions. Most ionic liquids are salts having a melting point below the working temperature. In some embodiments, salts having a melting point below about 100 ёC., for instance, below about 25° C., are preferred.

In an exemplary embodiment of the invention, the liquor comprises at least 90% ionic liquid (w/w).

In exemplary embodiments of the invention, the working temperature of the wet scrubber is between about −20° C. and about 200° C., optionally more than about 40° and/or less than about 80° C.

Non-limiting examples of ionic liquids that may be suitable for use in accordance with embodiments of the present invention include liquids having a halide as an anion, and one of the cations presented below, wherein each of R and R' independently is a C1-12 alkyl. In some embodiments, C4-8 alkyls are preferred.

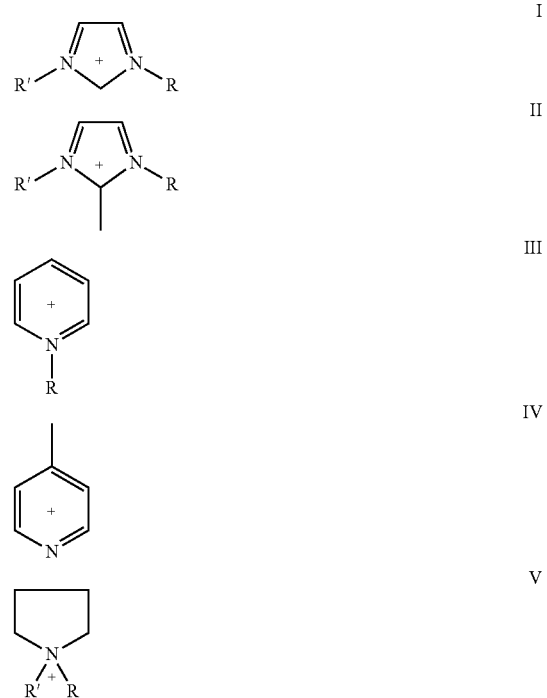

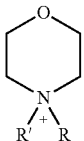

VI

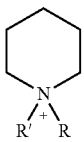

VII

Optionally, liquor 120 is substantially free of any ligand capable of binding the heavy metal or an ion thereof.

Optionally, a liquor is considered to be substantially free of any ligand capable of binding the heavy metal, if such a ligand is present in the liquid only in amounts that are not detectable. Alternatively, a liquor is considered substantially free of the ligand if the ligand is detectable; but removing the ligand to below detectable level changes the scrubber efficiency by less than 10%.

Optionally, a ligand capable of binding the heavy metal is an agent that forms with an ion of the heavy metal a complex through covalent (coordinate) bonds with two or more donor groups, so that one or more rings are formed.

In an embodiment of the invention, a liquor substantially free of any ligand capable of binding the heavy metal is substantially free of ligands that form stable complexes with ions of the heavy metal, but not of ligands that form complexes of low stability. In other embodiments, the liquor is free of any ligands that form with an ion of the heavy metal complexes of stability larger than 0.

Complexes of high stability are complexes having a stability constant of 30 or more, optionally complexes having a stability constant of 20 or more, optionally, complexes having stability of constant of 10 or more. Optionally, the difference in stability constant between complexes of high and low stability is at least 5.

A definition of the stability K of a complex is $$K = \log [ML]/[M][L],$$

where [ML] is the concentration of the complex, [M] is the concentration of the heavy metal ion, and [L] is the concentration of the ligand. All concentrations are in mol/liter.

In an exemplary embodiment of the invention, liquor 120 comprises an oxidizer. Preferable oxidizers are non-toxic and non-corrosive, for example, iodine.

Iodine, however, has a very high vapor pressure, of about 1 atmosphere at 25° C. Thus, iodine is expected to escape from the scrubber in large quantities, which might cause environmental hazards and require frequent refill.

Nevertheless, it has been surprisingly found that iodine does not contaminate the gas exiting from a liquor comprising, as a major component, an ionic liquid that has a halide as an anion. It was also found that chlorine dioxide does not contaminate the gas exiting from a liquor comprising, as a major component, an ionic liquid that has a halide as an anion. Without being bound to theory, these phenomena may be explained by the formation of a stabilizing complex between the oxidizing iodine (or chlorine dioxide) and the halide of the ionic liquid. Applicants are not aware of any prior publication of such a stabilizing complexes in an ionic liquid.

Similar stabilizing complexes may form in halidic ionic liquids with other halogens, for instance, chlorine and bromine.

Halogen-halide oxidizing complexes of the kind described above have the general formula $X_2Y^-$, wherein each of X and Y is independently selected from F, Br, Cl, and I. For instance, if an ionic liquid comprising chloride as the anion is used with iodine as the oxidizing moiety, it has been found that a complex of the formula $I_2Cl^-$ is formed.

Figure 2:
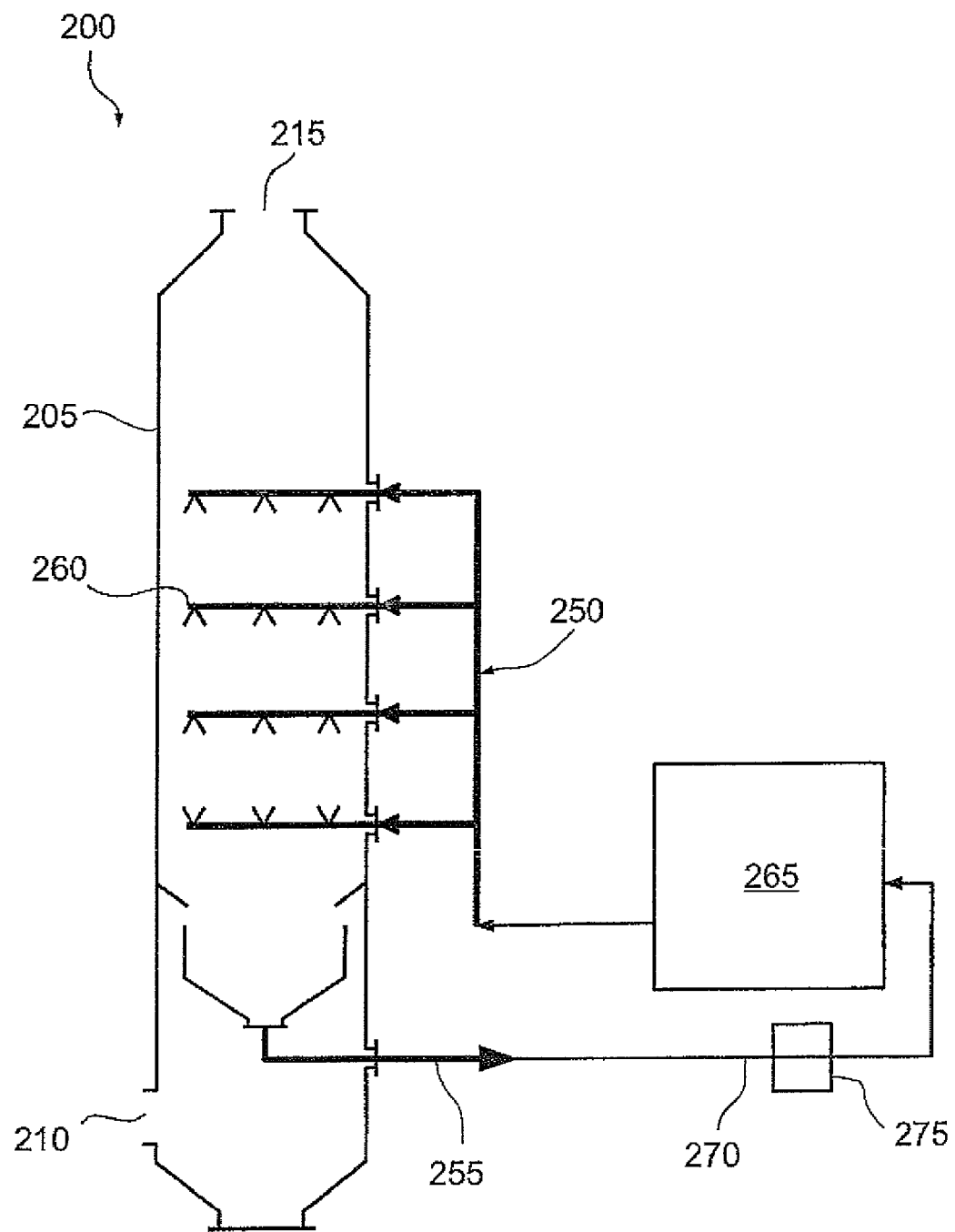
FIG. 2 is a schematic illustration of a scrubber according to an embodiment of the invention.

FIG. 2 is a schematic illustration of a wet scrubber 200 according to another exemplary embodiment of the invention. Scrubber 200 is of the kind known in the art as a Spray Tower Scrubber. In other embodiments of the invention other kinds of scrubbers may be used, for instance, a Cyclonic Spray Chamber Scrubber, a Packed Tower Scrubber, a Plate Tower Scrubber, a Venturi Scrubber, an Orifice Scrubber, or any other kind of wet scrubber known in the art. A summary of the characterizations of several known scrubbers may be found, for instance, in http://www.epa.gov/ttn/caaa/t1/reports/sect5-4.pdf.

Scrubber 200 is shown to have a vessel 205, a gas inlet 210 and a gas outlet 215. Additionally, scrubber 200 has a liquid inlet 250 and a liquid outlet 255. Scrubber 200 optionally has a demister (not shown) to collect liquid droplets that may be carried with the gas towards the exit.

In the embodiment shown in FIG. 2, the liquid inlet comprises sprinkles 260.

Sprinkles 260 provide liquid into vessel 205 in droplets, and therefore increase the surface of the liquid that contacts the gas. Liquid inlet 250 is connected to a liquid source 265.

Liquid outlet 255 allows liquid to leave the scrubber 200 during operation of the scrubber. The liquid optionally leaves through an ionic liquid path 270, which optionally is connected to the ionic liquid source 265.

Optionally, path 270 goes through a filter 275 for filtering ionic liquid leaving the vessel.

As a rule, the scrubber is more efficient as the droplets are smaller.

In an exemplary embodiment of the invention, the liquid used with scrubber 200 is a liquor comprising an ionic liquid and an oxidizer.

Optionally, the liquor also comprises agents for reducing surface tension of the liquor, to allow formation of smaller droplets. Examples of such agents are detergents, for example, organic detergents and/or borax.

In operation, a gas is streamed through gas inlet 210 and impinges on droplets of liquor moving from sprinklers 260. Elemental heavy metal, for example mercury, comprised in the gas stream is oxidized into a salt by the oxidizer comprised in the liquor to form a salt. The salt is dissolved in the ionic liquid, and the gas leaves through outlet 210 with substantially reduced amount of mercury, either in ionic, elemental, or particulate bound form. In preferred embodiments of the invention, the amount of mercury is reduced in at least 80%, optionally at least 90%, and many times in 99% or more.

When the liquor is saturated with mercury salt, the salt precipitates, and is optionally filtered out by filter 275.

Figure 3:
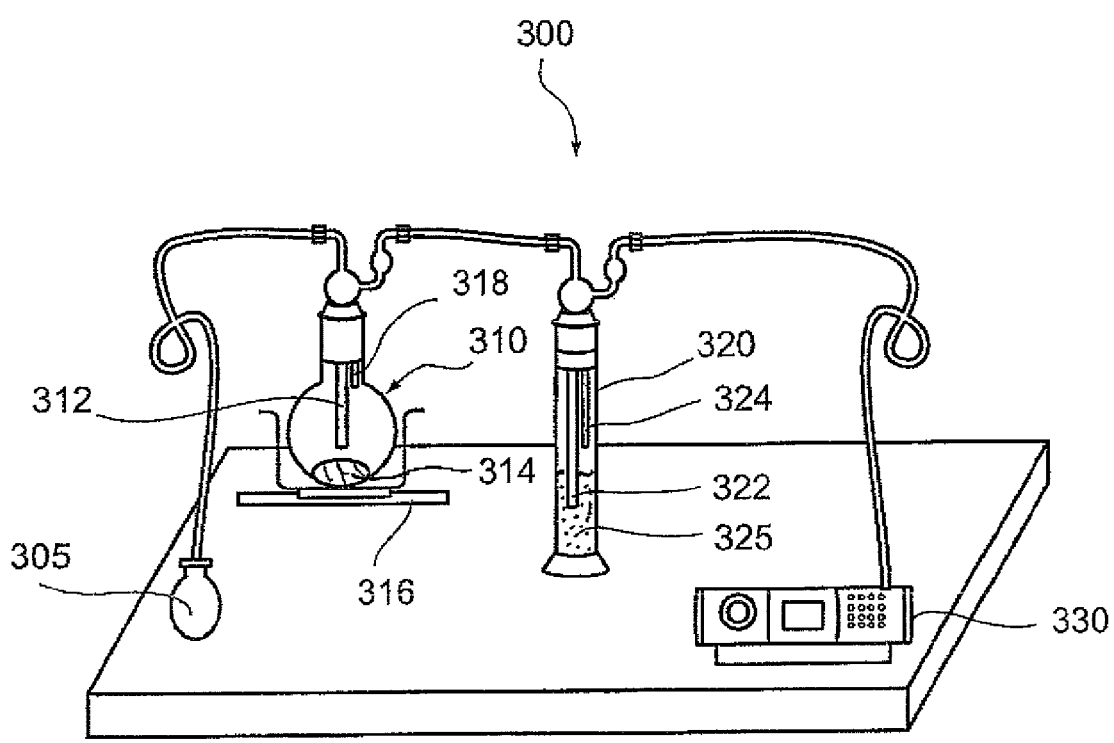
FIG. 3 is a schematic illustration of an experimental system, on which a method according to an embodiment of the invention was practiced.

FIG. 3 illustrates an experimental system 300 similar to the one at which the invention was first practiced. Experimental system 300 included an air pump 305, a mercury source 310, a vessel 320, and a mercury monitoring device 330. Vessel 320 had a liquor 325 according to an embodiment of the invention.

In operation, air was pumped by air pump 305 into mercury source 310 through tube 312 at about 2 lit/min. The mercury (314) in source 310 was optionally heated with the aid of heater 316. Without heating, air with about 75 ppb (=parts per billion) mercury vapor left mercury source 310 through a tube 318, and entered vessel 320 through gas inlet 322. The air and the mercury bubbled into liquor 325 out to the atmosphere above the liquor, from where the material exiting was collected through a gas outlet 324 and monitored for the existence of mercury with monitoring device 330. The efficiency of the system was shown to be constant for about five months without refilling or regenerating iodine or ionic liquid. The ionic liquids were prepared according to the procedure described by R. S. Varma et al. in Chem. Commun., 2001, pages 643-644, the contents of which is incorporated herein by reference.

Table I presents physical properties of some ionic liquids used with the system of FIG. 3. Aliquat 336 listed in the table is a commercially available ionic liquid of the chemical name trioctylmethylammonium chloride salt.

TABLE I

Physical properties of some ionic liquids used with the system of FIG. 3.

| Entry | Ionic Liquid | Yield (%) | Dencity (g/cm³)$^a$ | Viscosity (mPa·s)$^b$ | Decomposition temp. (° C.)$^c$ |
|---|---|---|---|---|---|
| 1 | [BMIM][Br−] | 93 | 1.18 | 70 | 240 |
| 2 | [OMIM][Br−] | 85 | 1.08 | 162 | 252 |
| 3 | [BMIM][Cl−] | 82 | 0.99 | 12 | 220 |
| 4 | [HMIM][Cl−] | 88 | 1.03 | 32 | 209 |
| 5 | [OMIM][Cl−] | 86 | 1.10 | 225 | 212 |
| 6 | Aliquat-336$^d$ | — | 0.88 | 197 | — |

$^a$Density measurement was performed at 20° C.;
$^b$Viscosity measurement was performed at 50° C. using Brookfield DV-II+ viscometer;
$^c$Measured by TGA and DSC analytical tools;
$^d$Purchased from Aldrich.

The cations of the ionic liquids are abbreviated as follows: BMIM stands for 1-butyl-3-methylimidazolium, HMIM stand for 1-hexyl-3-methylimidazolium and OMIM stands for 1-octyl-3-methylimidazolium.

Table II summarizes absorption obtained in the system of FIG. 3 with liquors consisting of the liquids of table I and iodine in the amounts indicated in the table. When 7.0 mg iodine was used per 12 g ionic liquid, all the liquids of table I except for Aliquat 336 provided more than 99% removal of mercury. Aliquat 336 did not provide mercury removal of over 88.6%, no matter how much iodine was added to it, up to 40.0 mg/12 g iodine/Aliquat.

Without being bound to theory, it is suggested that the performance of Aliquat was not as good as those of the other ionic liquids examined because it has a small cationic core hidden between long alkyl chains. If this suggestion is correct, it may be preferable to use ionic liquids with aromatic cations and relatively short alkyl chains, for instance, chains of 2-8 carbons. Optionally, the aromatic cation comprises a cyclic cation with a positive charge resonating among the entire cycle. Optionally, the cyclic cation is a heterocycle. Optionally, the cyclic cation comprises a 5-membered or 6-membered ring. Optionally, one or more of the 5 or 6 members is a nitrogen atom, and the rest, carbon atoms.

TABLE II

A summary of absorptions obtained for the system of FIG. 3 with liquors consisting of liquids listed in table I and iodine in amounts indicated.

| | | Iodine amount (mg/12 g of ionic liquid) | | | | |
|---|---|---|---|---|---|---|
| | | 0 | 2.2 | 4.6 | 7.0 | 9.4 |
| Entry | Ionic liquid | Absorption of Hg⁰ (%) | | | | |
| 1 | [BMIM][Br−] | 2.4 | 79.9 | 94.6 | 99.2 | 99.8 |
| 2 | [OMIM][Br−] | 2.6 | 77.9 | 84.3 | 99.1 | 99.1 |
| 3 | [BMIM][Cl−] | 2.9 | 90.5 | 97.1 | 99.8 | 99.8 |
| 4 | [HMIM][Cl−] | 2.5 | 90.3 | 96.7 | 99.2 | 99.7 |
| 5 | [OMIM][Cl−] | 2.8 | 86.1 | 96.3 | 98.9 | 99.5 |
| 6 | Aliquat-336 | 1.6 | 58.0 | 68.7 | 85.2 | 88.6 |

In the experiments summarized in table II, the initial flow of gaseous mercury was kept as 75.5 ppb (100%). The amount of all ionic liquids have been kept as 12.0 g to maintain the uniform contact time of gaseous mercury in the ionic liquids. This contact time was in all the experiments 0.2 sec.

A similar experiment (with [BMIM]Cl—) was carried out with motorcycle exhaust gas replacing the air. The gas entering the liquor contained about 60 ppb mercury, and the gas exiting the liquor had mercury below the detection threshold of monitoring device 330, which was an ICP-OES (Vista-MPX by Varian).

It should be noted that iodine did not escape from the system, and the only loss of iodine was due to its reaction with elemental mercury. In contrast, iodine did escape under similar conditions from water and from organic liquids that are not ionic liquids, even if they included a metal halide salt that formed an iodine-halide complex with the iodine. This surprising stability of the halogen-halide complex in ionic liquids, may be explained, perhaps, in the high concentration of the halide, and/or stabilization of the complex by the cation of the ionic liquid.

Since in the oxidation of elemental mercury by iodine, 1 mol of iodine reacts with one mole of mercury, about 1.25 g of iodine are required for absorbing 1 g of mercury. Since coal usually has less than 125 ppb mercury, of which only about half is elemental mercury, which may be oxidized by the iodine, 1.25 g iodine are sufficient to react with at least about 16 tons of coal. Thus, the iodine needs refreshing only at substantial time intervals.

In a separate experiment, 2 g of elemental mercury were introduced into a flask placed in a thermostatic water bath maintained at constant temperature of 25° C. Flow of air (constant rate of 1.5 liter/min) supplied by an air pump 305 was passed through the flask. The air stream enriched with mercury was passed through a trap 325 containing 12 g of a liquor that contained ionic liquid with 3.36 g water (28% W(water)/W(Total)), mixed with 0.2 g of iodine (1.6%). After the trap 325 the gas flow was connected to a mercury gas analyzer 330 (Hg Monitor 3000 by SMT, Germany). The efficacy of the mercury capture was measured by comparing the concentration of mercury in the gas stream when the gas was passed through the trap or via the bypass (% of Hg captured). It was found that under the above conditions the concentration of mercury in the air stream (using bypass instead of trap 325) was constant at 90 ppb (W/V) and after the absorption process with the liquor (exceed through trap 325) the Hg concentration decreased to 1.5 ppb, this stands for a 98.3% absorption yield. The residence time of the air in the trap 325 is approximately 0.1 second.

In another experiment, 2 g of elemental mercury were introduced into a flask placed in a thermostatic water bath maintained at constant temperature of 25° C. Flow of air (constant rate of 1.5 liter/min) supplied by an air pump 305 was passed through flask. The air stream enriched with mercury was passed through a trap 325 containing 12 g of liquor that contained ionic liquid with 6 g water (50% W(water)/W (Total)), mixed with 0.2 g of iodine (1.6%). After the trap 325, the gas flow was connected to a mercury gas analyzer 330 (Hg Monitor 3000 by SMT, Germany). The efficacy of the mercury capture was measured by comparing the concentration of mercury in the gas stream when the gas was passed through the trap or via the bypass (% of Hg captured). It was found that under the above conditions the concentration of mercury in the air stream (using bypass instead of trap 325) was constant at 90 ppb (W/V) and after the absorption process with the liquor (exceed through trap 325) the Hg concentration decreased to 2 ppb, this stand for a 99.34% absorption yield. The residence time of the air in the trap 325 is approximately 0.1 second.

Figure 4:
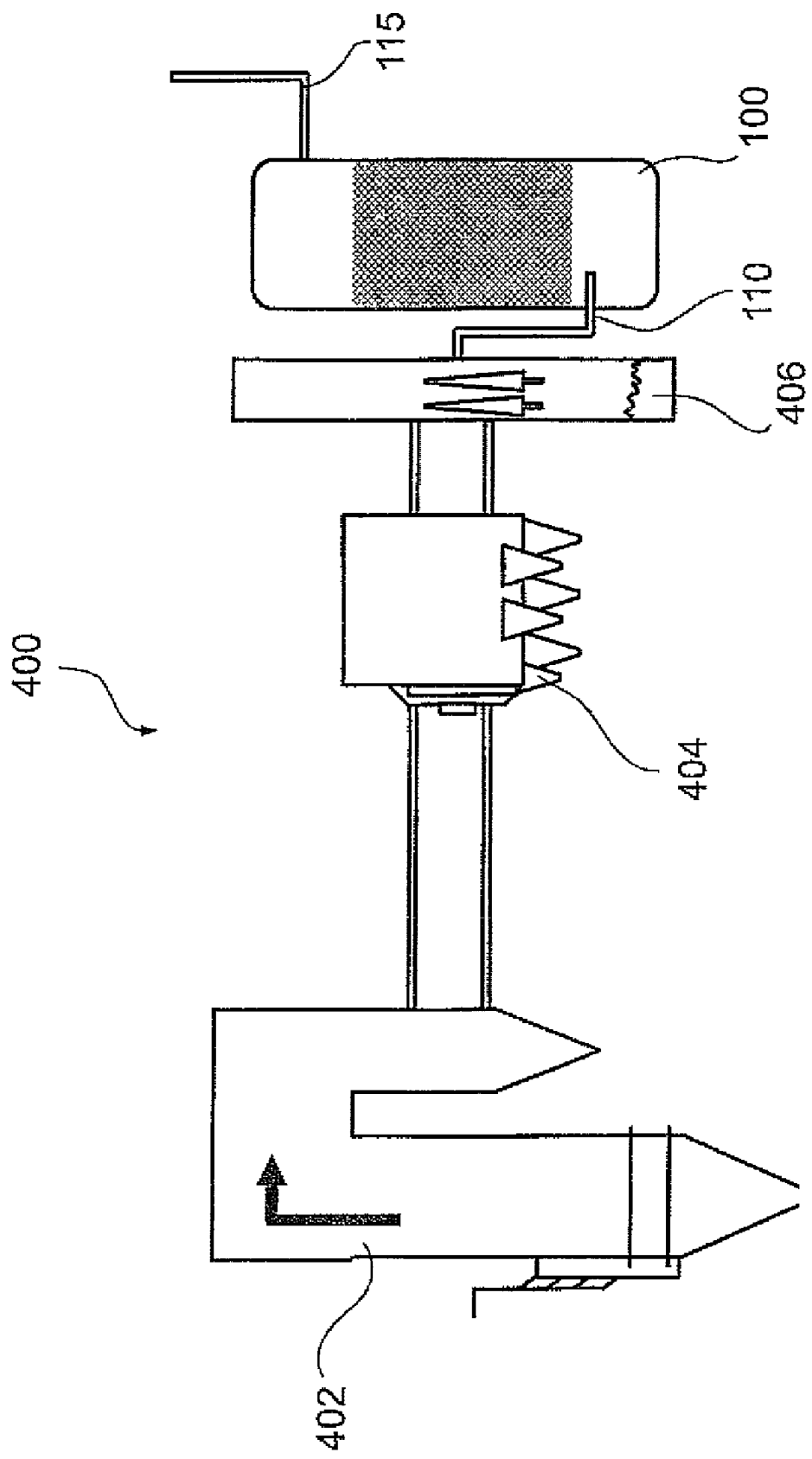
FIG. 4 is a schematic illustration of a power plant according to an embodiment of the invention.

FIG. 4 is a schematic illustration of a power plant (400) according to an embodiment of the invention. Power plant 400 has a furnace 402 that receives coal and air and lets out flue gas. The flue gas goes first through a filter 404 for removing ash, and generally large particulate matter. Non-limiting examples of filters suitable for use as a filter 404 include fabric filters and electrostatic separators. Optionally, gas exiting filter 404 goes into a flue gas desulfurization unit (FGD) (406), which further separates acidic components of the general formula SOx from the flue gas.

In the embodiment shown, FGD 406 functions as a gas source, and gas exiting from unit 406 is fed into gas inlet 110 in scrubber 100. Scrubber 100 directly receives gas from unit 406, and indirectly receives gas from filter 404.

Optionally, flue gas going from furnace 402 is cooled on its way to filter 404 with heat exchangers (not shown). Alternatively or additionally, other units in the power plants, for instance, filter 404, unit 406, and/or other units, not shown, cool the flue gas, such that the flue gas enters scrubber 100 at a temperature lower than the decomposition temperature of the ionic liquid in the scrubber.

It is expected that during the life of a patent maturing from this application many relevant scrubbers, and ionic liquids will be developed and the scope of the terms scrubber, and ionic liquid, are intended to include all such new scrubbers, and ionic liquids a priori.

For instance, other structures of scrubbers may be developed or adapted for use in accordance with some embodiments of the present invention, allowing for contacting the gas with the liquid, introducing and/or releasing the liquid, and/or introducing and/or releasing the clean gas in ways other than those described therein.

In another instance, other ionic liquids may be developed or found to be effective in allowing for efficiently stabilizing an oxidizing agent without hindering the stabilized oxidizing agent so as to substantially slow down its reaction with elemental heavy metals.

It is also expected that during the life of a patent maturing from this application many relevant liquors will be developed and the scope of the term liquor is intended to include all such new liquors a priori.

For instance, other nonvolatile liquids, including, but not limited to ionic liquids, and/or other green oxidizers may be developed.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The terms "comprises", "comprising", "includes", "including", "having" and their conjugates mean "including but not limited to".

When a first element is described or claimed to comprise a second element, this should be construed as if the first element comprises, one or more of said second element, and as a disclosure of two kinds of a first element: one kind in which the first element comprises only one second element, and another kind, in which the first element comprises a plurality of second elements. This definition holds also if the first element is said to include, have, contain, etc. a second element.

The words "the" and "said" are used interchangeably, and the appearance of one of them rather than the other should not be used for construing the sentence or claim, in which the word appears.

The phrases "between X and Y" and "from X to Y", where X and Y are two indicated numbers, are used herein interchangeably and are meant to include the first and second indicated numbers and all the fractional and integral numerals therebetween.

What is claimed is:

1. A wet scrubber for absorbing elemental heavy metal from a gas stream, the scrubber comprising:
    a vessel having a gas inlet and a gas outlet, and in the vessel,
    a liquor comprising:
        an oxidizer capable of oxidizing said elemental heavy metal and an ionic liquid,
        the liquor being substantially free of any ligand capable of binding an ion of the heavy metal.

2. A wet scrubber according to claim 1, wherein said ionic liquid is solubilized in at least one liquid medium.

3. A wet scrubber according to claim 2, wherein said liquid medium is water.

4. A wet scrubber according to claim 1, comprising a liquid inlet and a liquid outlet, the scrubber being configured to contact liquid with the gas between said liquid inlet and outlet.

5. A wet scrubber according to claim 1, wherein said oxidizer is selected from the group consisting of chlorine dioxide and iodine.

6. A wet scrubber according to claim 1, wherein said ionic liquid comprises a cation and an anion, and said anion is a halide.

7. A wet scrubber according to claim 1, wherein the liquor is in form of a mist.

8. A wet scrubber according to claim 1, wherein the heavy metal is elemental and the ionic liquid has an oxidation potential that is insufficient for oxidizing the elemental heavy metal at the working temperature of the scrubber.

9. A wet scrubber according to claim 1, configured for separating mercury from a gas stream.

10. A wet scrubber according to claim 1, configured for separating a heavy metal from a flue gas.

11. A wet scrubber according to claim 1, wherein said liquor comprises a compound of the general formula $A^+X^-Y_2$, wherein
    $A^+X^-$, at 25° C., is an ionic liquid; and
    X and Y are each independently F, Cl, Br, or I.

12. A wet scrubber according to claim 11, wherein said liquor comprises a compound wherein $A^+$ is selected from 1-butyl-3-methylimidazolium, 1-hexyl-3-methylimidazolium, and 1-octyl-3-methylimidazolium.

13. A wet scrubber for absorbing, at a working temperature, a heavy metal from a gas stream, the scrubber comprising:
a vessel having a gas inlet and a gas outlet, and in the vessel, a liquor comprising:
an ionic liquid comprising an anion and a cation, and
an oxidizing complex capable of oxidizing, at the working temperature, said heavy metal, the oxidizing complex comprising an oxidizing moiety and a complexing agent, said oxidizing complex having, in the liquor, a partial vapor pressure that is at least 10 times smaller than a vapor pressure of the oxidizing moiety in pure state.

14. A wet scrubber according to claim 13, wherein said oxidizer is selected from the group consisting of chlorine dioxide and a halogen.

15. A wet scrubber according to claim 13, wherein said oxidizing complex is a compound of the general formula $X_2Y^-$, wherein each of X and Y is independently selected from F, Br, Cl, and I.

16. A method of scrubbing elemental heavy metal from a gas stream, the method comprising:
providing a liquor free to move in a vessel, the liquor comprising an ionic liquid and an oxidizer capable of oxidizing the elemental metal; and
directing the gas stream into the vessel so as to contact with the liquor.

17. A method according to claim 16, wherein providing a liquor comprises: reacting said ionic liquid with an oxidizing moiety, thereby obtaining a liquor comprising:
the ionic liquid and an oxidizing complex comprising the oxidizing moiety complexed with an ion of said ionic liquid.

18. A method according to claim 16, wherein said ionic liquid comprises an anion and a cation, and said anion is selected from chloride, bromide, and iodide.

19. A method according to claim 18, wherein contacting the gas with the liquor comprises bubbling a gas into the liquor or contacting the gas with liquor in the form of droplets or mist.

20. A method according to claim 19, wherein said heavy metal is mercury.

21. A method according to claim 16, the method comprising:
separating heavy metal salt from the liquor to obtain a liquor with reduced amount of metal salt; and
using the liquor with reduced amount of metal salt for scrubbing the heavy metal from the gas stream.

22. A method according to claim 16, wherein the liquor comprises a compound
of the general formula $A^+X^-Y_2$, wherein
$A^+X^-$, at 25° C., is an ionic liquid; and
X and Y are each independently F, Cl, Br, or I.

23. A method according to claim 22, wherein the liquor comprises a compound wherein $A^+$ is selected from 1-butyl-3-methylimidazolium, 1-hexyl-3-methylimidazolium, and 1-octyl-3-methylimidazolium.

24. A compound of the general formula $A^+X^-Y_2$, at wherein
$A^+X^-$, at 25° C., is an ionic liquid; and
X and Y are each independently F, Cl, Br, or I,
wherein $A^+$ is selected from any one of general formulae I-VII:

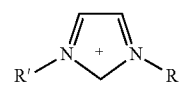

I

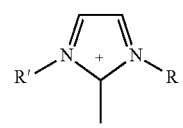

II

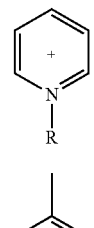

III

IV

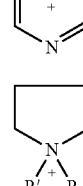

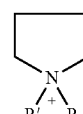

V

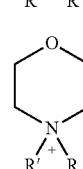

VI

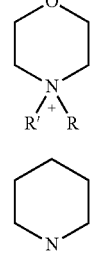

VII

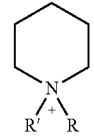

each of R and R' independently is a $C_2$-$C_{10}$ alkyl.

25. A compound according to claim 24, wherein $A^+$ is selected from 1-butyl-3-methylimidazolium, 1-hexyl-3-methylimidazolium, and 1-octyl-3-methylimidazolium.

26. A compound according to claim 24, wherein Y is I.

27. A compound according to claim 24, wherein X is Cl.

* * * * *